Oct. 31, 1961     L. T. GAUMER     3,006,289
OVERLOAD RELEASING PUSHER DEVICE FOR FLOOR CONVEYORS
Filed May 10, 1957
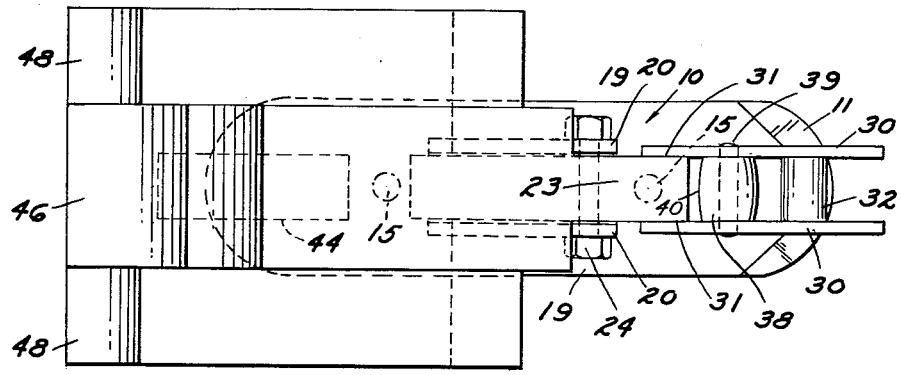
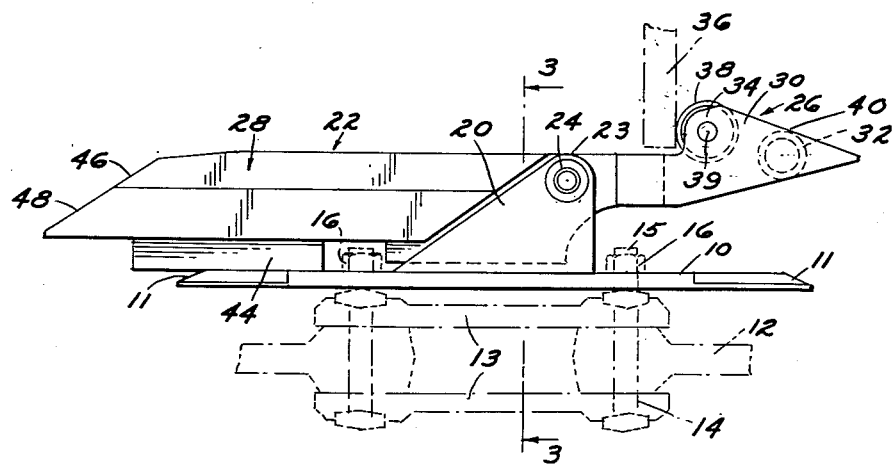
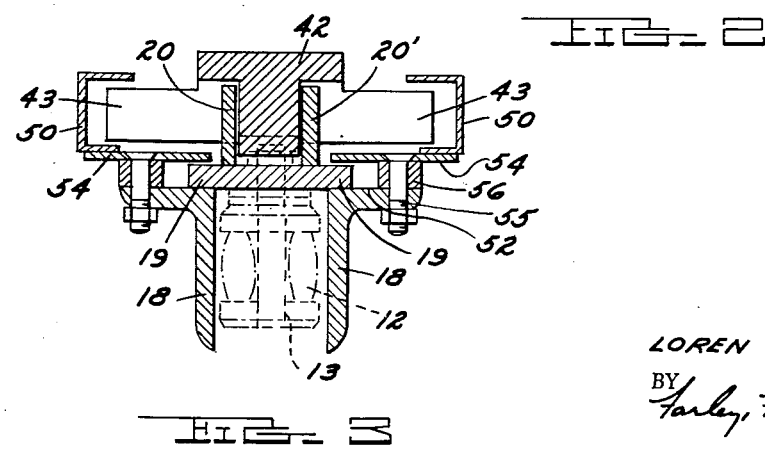
INVENTOR.
LOREN T. GAUMER
BY
ATTORNEYS

United States Patent Office 3,006,289
Patented Oct. 31, 1961

3,006,289
OVERLOAD RELEASING PUSHER DEVICE FOR FLOOR CONVEYORS
Loren T. Gaumer, Covina, Calif., assignor to Jervis B. Webb Company, Detroit, Mich., a corporation of Michigan
Filed May 10, 1957, Ser. No. 658,420
9 Claims. (Cl. 104—172)

This invention relates to an improved device for pushing the carrier or car of a floor conveyor, the device being of the type which automatically releases or disengages itself in the event the load exerted by the carrier on the conveyor line increases beyond a desired amount.

Pusher devices, frequently called pusher dogs, are generally used with floor conveyors, where they are attached to the endless driven conveyor member, and have an upwardly projecting driving abutment which engages a drive plate or pin on the carrier. Floor conveyor carriers conventionally comprise wheeled cars or pallets supported by stationary rollers. If for any reason movement of a particular carrier should be obstructed, considerable damage can result before the conveyor drive unit can be stopped. Self-releasing pusher devices have been employed as a protective device, with the added advantage of permitting movement of a particular carrier and all following carriers to be interrupted, as is frequently necessary where a floor conveyor installation is used for an assembly operation.

The present invention provides a simplified and improved form of such a self-releasing pusher device which comprises a base portion having means for connecting the propelling member of the conveyor thereto. A pusher member or dog is pivotally mounted on the base portion on a transverse axis, the pusher dog having a driving projection located on one side of the pivotal axis and a counter-weight portion located on the other side of the pivotal axis. The driving projection has a driving surface which is located relative to the pivotal axis so that the reaction force between the driving surface and the drive member of a carrier has a component tending to produce pivotal movement of the dog in a releasing direction, while the counter-weight portion is provided with sufficient mass to counteract such pivotal movement to an extent sufficient to establish a normal driving force between the driving surface of the pusher dog and the carrier drive member.

Preferably the driving surface is formed by a roller mounted on a transverse axis located so that the carrier drive member projects beyond, or overlaps this axis when engaged by the roller. For a conveyor installation having horizontal turns, the driving surface of the roller is preferably made convex.

Preferably also the driving surface of the pusher dog flares into a resetting surface which gradually extends along the dog to a level below the level of engagement between the driving surface and drive member of the carrier.

Preferably also the pivoted pusher dog includes at least one portion which projects to one side of the path of travel. This projecting portion is engageable by a stationary member extending alongside the path of travel to prevent pivotal movement of the pusher dog to released position along certain sections of the conveyor line. This feature is used, for example, where the conveyor traverses horizontal or vertical changes in direction where an increased driving force is normally required.

This projecting portion is preferably provided with a tapered leading edge to insure proper positioning of the pusher dog for entering a section of the conveyor where the stationary movement restraining member is used.

The leading edge of the counter-weight portion of the pusher dog is preferably also tapered to insure that the pusher dog will be returned to driving position when overtaking the drive member of a carrier.

The counter-weight portion of the pusher dog preferably rests upon and is supported by the base portion of the device when the pusher dog is in driving position. The weight of the counter-weight portion thereby also acts to counteract tipping movement of the chain, or other propelling member to which the pusher device is attached, when a load is engaged.

In the preferred form of construction, such tipping movement can also be prevented by the provision of laterally extending flanges on the base portion. The track section includes a channel for engaging these flanges to positively guide the pusher device in a path parallel to the path of travel of the propelling member.

A construction illustrating the preferred features mentioned above is disclosed in the accompanying drawing which comprises the following views:

FIG. 1, a plan view of the device;
FIG. 2, a side elevation thereof including a phantom showing of a conveyor chain and the attachment of the device thereto; and
FIG. 3, a sectional elevation taken along the line 3—3 of FIG. 2 and further including a representative type of track section with which the device is used.

The pusher device construction includes a base portion 10 which is a plate-like member having rounded and chamfered ends 11. In this form of the device, the base portion acts as a rider plate for supporting the conveyor propelling member, which is shown as a conventional chain of alternate center links 12 and side bars 13 joined by pins 14 having threaded extensions 15 which extend through holes in the plate 10. A nut 16 connects each of an adjacent pair of pins to the plate 10. The conveyor structure includes a pair of angle members 18 (FIG. 3) which act to define the path of travel of the chain and also to form a supporting track for the rider plate formed by the laterally projecting portions 19 of the base plate 10.

A pair of vertical plates 20 are mounted on the upper surface of the base plate 10, forming a longitudinally extending yoke or clevis, and a pusher dog, generally indicated by the reference 22, has a portion 23 dimensioned to be received between the pair of plates 20, being pivotally secured thereto by a bolt 24.

Longitudinally, the pusher dog 22 is divided by the axis of the bolt 24 into two portions, a driving portion 26, and a counter-weight portion 28. The driving portion 26 is formed by a pair of plates 30 which are connected to opposite sides of the main pusher dog member at 31, and are joined together by a tubular cross member 32. Each plate 30 is formed with a driving projection 34 extending upwardly from the normal level of the pusher dog 22 into the path of movement of a carrier drive member 36. In the construction shown, drive member 36 is a plate which depends in the conventional manner from a standard type of carrier (not shown). A roller 38 is rotatably carried between the plates 30 on a pin 39, with the axis of the pin 39 lying above the lower edge of drive plate 36, or in overlapping relation therewith. Preferably the roller 38 has a convex driving surface 40 for improved contact with the drive member 36 in negotiating horizontal turns.

Each of the plates 30 is formed with what will be termed a resetting surface 40 tapering from the driving surface of the roller 38 to a level below the level of engagement between the roller and the drive plate 36.

The counter-weight portion 28 of the pusher dog shown is formed of three parts, a central member 42 and a pair of side members 43 which form laterally projecting flanges. The central portion 42 is somewhat T-shaped in cross-section, as can be seen in FIG. 3, and includes a lower forward part 44 which rests upon the upper surface of base plate 10 when the pusher dog is in normal position, thereby establishing such normal position and transmitting the weight of the counter-weight portion to the base plate. At its forward end, central portion 42 is tapered at 46 (FIG. 1), and the forward portions of the side flanges 43 have a correspondingly tapered leading edge 48.

The driving reaction between driving surface 38 and drive member 36 includes a component tending to produce rotation of the pusher dog about its pivot pin 24 in a clockwise direction as the parts are viewed in the drawing, FIG. 2. The counter-weight portion of the dog 28 is constructed with sufficient weight to produce a counteracting moment about the pivot pin 24 for a normal amount of driving force. If for any reason the reaction between the pusher dog and the carrier increases beyond this normal amount, the moment of the counter-weight portion will be overcome and the dog will rotate to a release position and will move on with the conveyor chain. In this event, resetting surfaces 40 of the pusher dog will ride under the drive plate 36 to give a controlled, smooth return movement of the dog to normal driving position. Should a dog not return to normal driving position by itself, contact between the tapered leading edges 46 and 48 an overtaken drive plate 36 will positively move the dog to driving position. Resetting surfaces 40 also will permit tripping of the pusher dog by the drive plate 36 so that a carrier can be manually advanced ahead of the pusher dog into position to be driven.

The normal reaction force between a pusher dog and a carrier will increase materially at any section of a conveyor where a change in direction takes place. Of course this can be counteracted by increasing the moment of the counter-weight portion accordingly, but where this is not desirable, a minimum releasing reaction value can be retained by employing positive hold-down members 50 which form a motion restraining channel through which the projecting side flanges 43 of the dog must pass, as shown in FIG. 3.

The reaction force between the dog and the carrier also has a component which tends to produce tipping movement of the drive chain. In part, this is counteracted by the weight of the counter-weight portion of the dog resting upon the base portion 10. It can also be more positively counteracted by providing a channel through which laterally projecting portions 19 of the base plate must pass. As shown in FIG. 3, such a channel is formed by the upper surfaces 52 of the angle guide member 18 and the lower surfaces of hold-down plates 54 which are each shown connected to the angle guides 18 by a bolt 55 and spacer 56. In case the base portion 10 of the device is made as a trolley by the substitution of wheels to perform the function of the lateral projections 19, the same type of hold-down results can be obtained by the employment of a channel type of track.

The construction of the device is relatively simple, particularly as compared with self-releasing pusher devices which are spring urged to normal driving position. In operation, it is more positive, reliable, smooth and quiet than such other devices.

While preferred embodiments have been described above in detail, it will be understood that numerous modifications might be resorted to without departing from the scope of my invention as defined in the following claims.

I claim:

1. A conveyor carrier pusher device of the type having a pivotally mounted pusher member normally urged to a position for engaging a carrier drive member, characterized by said pusher device having a base portion including means for pivotally mounting said pusher member thereon on an axis transverse to the direction of conveyor travel for movement of said pusher member between driving and disengaged positions, said pusher member having a driving surface for engaging said carrier drive member, said driving surface being located relative to said pivotal axis so that the reaction force between said driving surface and said carrier driving member has a releasing component tending to produce pivoting of said pusher member driving surface to said disengaged position, said pusher member including an integral counter-weight portion, said counter-weight portion being located relative to said pivotal axis so as to exert a moment counteracting said releasing component and thereby establishing a normal driving force between said pusher member driving surface and said carrier drive member.

2. A conveyor carrier pusher device according to claim 1 wherein said driving surface of the pusher member is shaped so as to increase the said releasing component once the normal driving force has been exceeded thereby and such pivotal movement of said pusher member begins.

3. A conveyor carrier pusher device as set forth in claim 2 wherein said driving surface is formed by a roller mounted on said pusher member on an axis transverse to the direction of conveyor movement, said axis being located in overlapping relation with said carrier drive member when the pusher member is in normal driving position.

4. A conveyor carrier pusher device according to claim 1 further characterized by said driving surface being followed by a resetting surface formed on said pusher member, said resetting surface extending from said driving surface gradually downward to a level below the level of engagement between said driving surface and said drive member when said pusher member is in normal driving position, said resetting surface being engageable by said carrier drive member on disengagement of said pusher member driving surface therewith to control return movement of said pusher member to said driving position.

5. A conveyor carrier pusher device as set forth in claim 1 further characterized by said pivoted pusher member including at least one portion projecting laterally to one side of the path of travel of said conveyor, said conveyor including a stationary member mounted alongside a part of the length of such path of travel and engageable by said laterally projecting portion to restrict pivotal movement of said pusher member from normal driving to disengaged position.

6. A conveyor carrier pusher device according to claim 5 wherein said laterally projecting portion is provided with a transverse tapered face on its leading portion.

7. A conveyor carrier pusher device as set forth in claim 1 wherein the leading transverse edge of said pusher member is tapered for engagement by the drive member of an overtaken carrier in the event the pusher member is not in normal driving position.

8. A conveyor carrier pusher device according to claim 1 wherein said counter-weight portion of the pusher member is supported by the forward upper surface of said base portion when said pusher member is in normal driving position.

9. A conveyor carrier pusher member according to claim 1 wherein said base portion includes means for connecting a conveyor chain thereto, said counter-weight portion including means engageable with the upper surface of the forward part of said base portion for support thereby whereby the weight of said counter-weight portion counteracts tipping movement of said chain resulting from the reaction force between the driving surface of said pusher member and said carrier drive member.

References Cited in the file of this patent

UNITED STATES PATENTS

| | | |
|---|---|---|
| 797,610 | Schaefer | Aug. 22, 1905 |
| 1,563,879 | Thompson | Dec. 1, 1925 |
| 1,618,348 | Nicolai | Feb. 22, 1927 |
| 1,660,039 | Johnson | Feb. 21, 1928 |
| 1,859,486 | Aimes | May 24, 1932 |
| 2,101,353 | Waalkes | Dec. 7, 1937 |

FOREIGN PATENTS

| | | |
|---|---|---|
| 38,010 | Germany | May 24, 1956 |
| 931,778 | Germany | Aug. 16, 1955 |